(12) United States Patent
Grewell et al.

(10) Patent No.: US 6,486,433 B2
(45) Date of Patent: Nov. 26, 2002

(54) TRANSPARENT PRESSURE BLADDER

(75) Inventors: David Grewell, Waterburg; Donald C. Lovett, Shelton, both of CT (US)

(73) Assignee: Branson Ultrasonics Corporation, Danbury, CT (US)

(*) Notice: Subject to any disclaimer, the term of this patent is extended or adjusted under 35 U.S.C. 154(b) by 15 days.

(21) Appl. No.: 09/759,292

(22) Filed: Jan. 11, 2001

(65) Prior Publication Data

US 2002/0088777 A1 Jul. 11, 2002

(51) Int. Cl.$^7$ .............................................. B23K 26/00
(52) U.S. Cl. ..................... 219/121.63; 219/121.64; 219/121.84; 219/121.85
(58) Field of Search ................. 219/121.63, 121.64, 219/121.84, 121.85, 521; 228/106

(56) References Cited

U.S. PATENT DOCUMENTS

| | | | | |
|---|---|---|---|---|
| 4,889,276 A | * | 12/1989 | Cadwell et al. ............. | 228/265 |
| 4,944,125 A | | 7/1990 | Ito | |
| 5,037,500 A | * | 8/1991 | Hilpert ........................ | 156/503 |
| 5,710,414 A | * | 1/1998 | Matsen et al. ............... | 219/633 |
| 5,893,959 A | * | 4/1999 | Muellich ................. | 156/272.8 |
| 5,943,474 A | | 8/1999 | Lovett | |
| 5,949,959 A | | 9/1999 | Lovett et al. | |
| 6,064,798 A | | 5/2000 | Lovett et al. | |
| 6,180,932 B1 | * | 1/2001 | Matsen et al. ............... | 219/615 |

* cited by examiner

Primary Examiner—M. Alexandra Elve
(74) Attorney, Agent, or Firm—Harness, Dickey & Pierce, P.L.C.

(57) ABSTRACT

An inflatable bladder system for applying generally uniform pressure to parts being welded to insure proper contact at the welding interface includes a first sheet that is generally transparent to electromagnetic radiation to allow such radiation to pass therethrough. This electromagnetic radiation serves to heat the parts to a temperature sufficient to create a weld. The inflatable bladder also includes a second sheet that is also generally transparent to electromagnetic radiation. The second sheet is coupled to the first sheet to create a sealed volume therebetween. Fluid is selectively introduced into the sealed volume in order to expand the bladder into engagement with the parts being welded to exert a generally uniform pressure thereon.

28 Claims, 1 Drawing Sheet

TRANSPARENT PRESSURE BLADDER

FIELD OF THE INVENTION

The present invention generally relates to pressure bladders, and more particularly, relates to transparent pressure bladders for welding plastics and the like materials utilizing electromagnetic radiation.

BACKGROUND AND SUMMARY OF THE INVENTION

Welding is commonly used to join plastic or resinous parts, such as automobile thermoplastic parts, at a welding zone. Typically, lasers have been used to provide the heat necessary to perform this welding operation (for example, see U.S. Pat. No. 4,636,609, the disclosure of which is incorporated herein by reference). Such lasers provide a focused beam of electromagnetic radiation at a specified frequency (i.e., coherent monochromatic radiation).

Infrared lamps and heaters, among others, are also used to provide infrared radiation for heating a welding zone. One such process is Through-Transmission Infrared (TTIR) welding. The TTIR welding technique utilizes infrared radiation that passes through at least one part (sometimes called the "transmission piece") in order to heat the welding zone in at least one other part so as to provide sufficient heat to create a welded joint between the contacted parts.

As is common in many welding industries, undesirable results may occur as a result of improper contact between the parts being welded. That is, each of the parts being welded includes various inconsistencies or tolerances, which may effect the proper contact pressure between the parts in the area of the welding zone. The effect of failing to maintain proper contact pressure between the parts being welded in the area of the welding zone is a reduction in the integrity of the resultant welded joint. Accordingly, there is a need in the relevant art to provide a method of maintaining proper contact pressure between parts being welded to promote a strong and integral welded bond therebetween.

An ancillary concern when welding plastic or resinous parts is to also minimize undesirable effects, including deformation and marking of the overall part, caused by undesirable frequencies of radiation energy being passed into the parts being welded. Infrared lamps and heaters emit polychromatic radiation which typically has a broader frequency range (i.e., polychromatic) than laser sources. However, some of the frequencies within this broader range produce undesirable results. These undesirable frequencies heat portions of the parts beyond the targeted or desired welding zone and/or temperature, thereby possibly creating deformation and marking of the overall part. Solid materials have been used to selectively filter or absorb these undesirable frequencies before the radiation reaches the targeted parts. However, solid filters suffer from several disadvantages, including uncontrolled buildup of heat, as well as having to be continually replaced due to the damage or degradation caused by the radiation or heat byproduct. The degradation of the solid filter over a period of time inhibits the performance of the solid filter to absorb these undesirable wavelengths.

Accordingly, there exists a need in the relevant art to provide a method and apparatus capable of exerting a generally uniform pressure upon a part being welded to maintain proper contact pressure during the welding process to maximize the integrity of the welded joint. Additionally, there exists a need in the relevant art to provide a method and apparatus that is generally transparent to desired wavelengths of radiation, yet is generally opaque to undesirable wavelengths of radiation.

In accordance with the broad teachings of the present invention, a primary object of the present invention includes providing an improved pressure bladder for exerting generally uniform pressure upon the parts being welded to assure proper contact therebetween during the welding process. It is another object of the present invention to provide a pressure bladder that is generally transparent so as not to substantially limit the transmission of desired laser radiation to the welding zone. It is yet another object of the present invention to provide a generally transparent pressure bladder that may also act as a filter medium to substantially limit the undesirable radiation wavelengths, if needed. Lastly, it is an object of the present invention to provide a method and apparatus that will overcome the disadvantages of the prior art.

In accordance with the broad teachings of this invention, an inflatable bladder system for applying generally uniform pressure to parts being welded to insure proper contact at the welding interface having an advantageous construction and method of use is provided. The inflatable bladder includes a first sheet that is generally transparent to predetermined electromagnetic radiation to allow such radiation to pass therethrough. This electromagnetic radiation serves to heat the parts to a temperature sufficient to create a welded joint. The inflatable bladder also includes a second sheet that is also generally transparent to predetermined electromagnetic radiation to allow such radiation to pass therethrough. The second sheet is coupled to the first sheet to create a sealed volume therebetween. Fluid is selectively introduced into the sealed volume in order to expand the bladder into engagement with the parts being welded to exert a generally uniform pressure thereon.

Further areas of applicability of the present invention will become apparent from the detailed description provided hereinafter. It should be understood that the detailed description and specific examples, while indicating preferred embodiments of the invention, are intended for purposes of illustration only.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
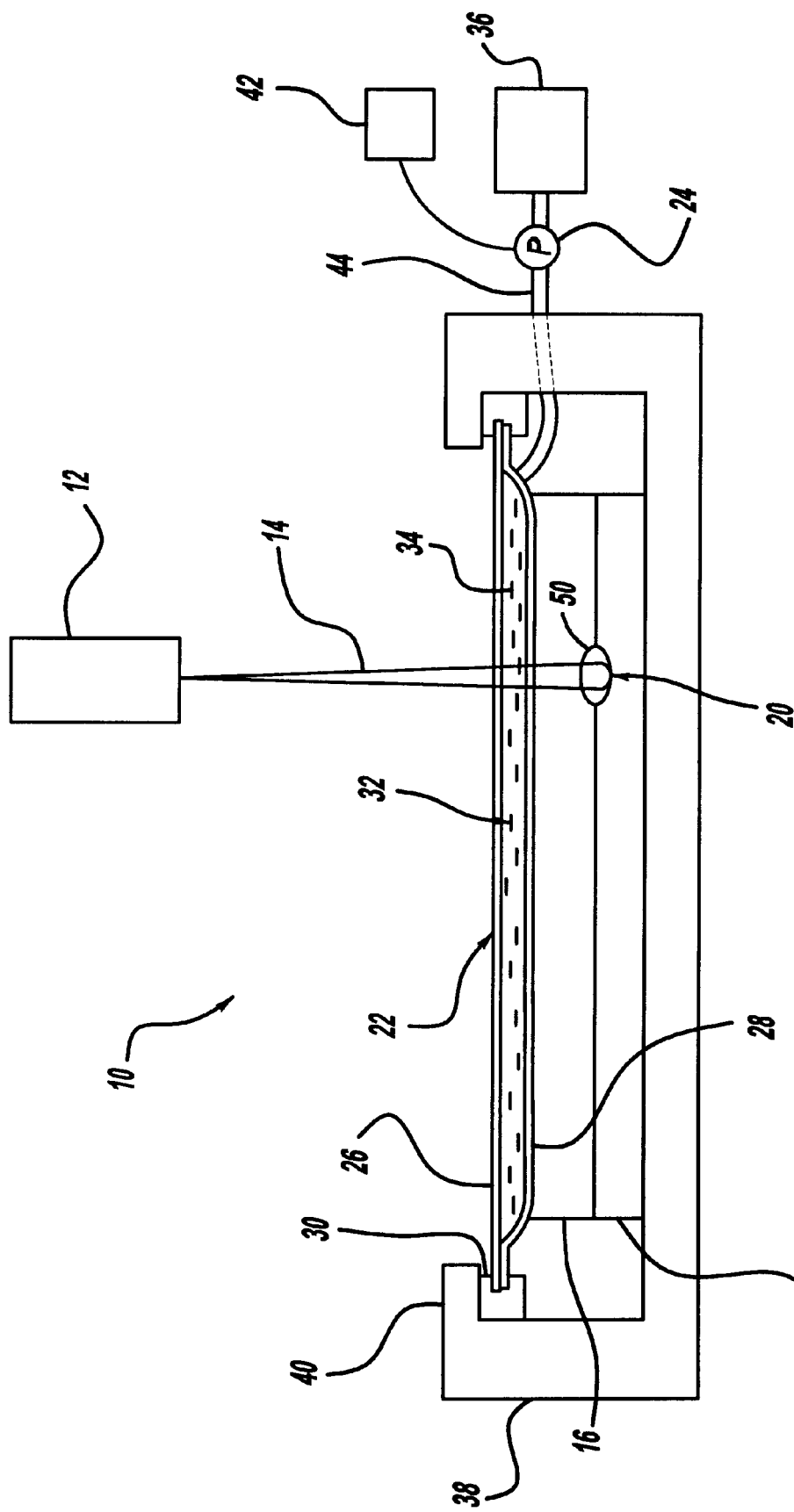
FIG. 1 is a diagrammatic side view of a welding apparatus employing the transparent pressure bladder of the present invention.

The following description of the preferred embodiments is merely exemplary in nature and is in no way intended to limit the invention, its application, or uses.

Referring to the drawing, there is disclosed a welding apparatus 10 comprising a radiation source 12, which emits noncoherent or coherent, polychromatic or monochromatic, electromagnetic radiation 14 in order to weld a first part 16 to a second part 18 at a welding zone 20. A uniquely designed generally transparent pressure bladder 22 is disposed between radiation source 12 and first part 16 in order to exert a generally uniform pressure upon first part 16 and second part 18. A pump 24 is provided to selectively inflate transparent pressure bladder 22 so as to exert the desired pressure upon first part 16 and second part 18.

Transparent pressure bladder 22 includes a rigid sheet 26 and a flexible sheet 28. Flexible sheet 28 is positioned generally adjacent to first part 16 so that when pump 24 inflates the area between flexible sheet 28 and rigid sheet 26, flexible sheet 28 is forced downwardly away from rigid sheet 26 and, thus, applies a constant and generally uniform pressure upon first part 16 and second part 18.

Transparent pressure bladder 22 further includes a frame 30 extending around the peripheral edge of rigid sheet 26 and flexible sheet 28. Frame 30 serves to provide structural integrity and a fluid seal along the peripheral edge of rigid sheet 26 and flexible sheet 28, thereby defining an internal sealed volume 32. Optionally, a clamp (not shown) can be used to maintain the structural integrity and sealing effect between rigid sheet 26 and flexible sheet 28.

It is important to note that transparent pressure bladder 22 must be generally transparent to enable the transmission of the desired wavelengths of radiation 14 to pass into welding zone 20 between first part 16 and second part 18. Furthermore, it is preferable that rigid sheet 26 remain relatively flat or parallel to the parts during pressurization of internal sealed volume 32. This arrangement causes pressurizing forces to be exerted upon flexible sheet 28 and in turn upon first part 16 and second part 18, thereby creating a generally uniform contact surface therebetween. It should be understood, however, that rigid sheet 26 may be made of a flexible material in the interest of manufacturing so as to be less susceptible to breakage and the like. However, it should also be understood that providing flexible sheets upon the top and bottom of transparent pressure bladder 22 will have the resultant effect of requiring a larger quantity of fluid to be pumped within internal sealed volume 32 during manufacturing. Therefore, it is preferable that rigid sheet 26 be made of a generally transparent rigid material such as polycarbonate, glass, or any other similar materials.

Flexible sheet 28 must also be generally transparent to radiation 14, yet capable of being deformed under pressurization so as to exert a generally uniform pressure across the entire weld surface. Accordingly, it is preferable that flexible sheet 28 be made of a material such as silicon rubber or any other similar material.

Alternatively, rigid sheet 26 and/or flexible sheet 28 may be made of a material sufficient to filter at least part of radiation 14 emanating from radiation source 12 by absorbing substantially all of the undesired wavelengths of radiation 14 before it can reach first part 16. This filtering produces filtered radiation upon exit from transparent pressure bladder 22. Likewise, internal sealed volume 32 may be filled with a fluid 34 that may also filter at least part of radiation 14 by again absorbing substantially all of the undesired wavelengths of radiation 14 before such radiation can reach first part 16. It should also be understood that the filtering attributes of rigid sheet 26, flexible sheet 28, and fluid 34 may each be different from the others, thereby providing a system capable of filtering different radiation wavelengths. It should also be understood that the type of fluid 34 may be easily changed in response to a change in desired wavelengths to be used.

As described above, fluid 34 may be any liquid including air, compressed gas, liquid, and the like. However, it is desirable that fluid 34 be a gas or liquid which is generally tolerable to high temperatures. In the case of a liquid, it is preferable that such liquid has a relatively high boiling point. The relatively high boiling point allows fluid 34 to absorb a significant amount of heat and also to not evaporate or boil during any filtering process. Fluid 34 should have a boiling point of at least about 120° F., more preferably at least about 240° F., and ideally at least about 350° F., either under atmospheric conditions or when contained in internal sealed volume 32.

When fluid 34 acts as both a filter and as a cooling or heat transfer agent, the preferred cooling/filtering fluid is a mixture of liquids comprising dimethyl esters of glutaric, adipic, and succinic acids. Such a dimethyl ester mixture is available commercially and may be obtained from such sources as Du Pont® under the trade name of Aliphatic Dibasic Esters.

Other examples of useful materials employed when fluid 34 is primarily employed as a cooling fluid or agent include materials which transmit (do not absorb) the radiation that is desired to effect the welding. These include materials selected from the group consisting of glycerol, ethyleneglycerol, dioctyl phthalate, tributyl phosphene, mineral, and mixtures or derivatives of these materials. However, it should be understood that the present invention is not limited to these fluids nor to the fluids of these absorption wavelengths or boiling points, but include other fluids, such as but not limited to gas compositions, whose physical characteristics are sufficient to filter undesirable radiation from any radiation source used in a welding operation for any appropriate material.

It should also be understood that additives may also be employed in the cooling or cooling/filtering fluid so long as they do not substantially degrade the absorption profile of the liquid in any materially adverse way.

A heat exchanger (not shown) may be connected in fluid communication with internal sealed volume 32 in order to cool fluid 34 during the welding process. As mentioned above, fluid 34 may be heated as a result of the exposure to radiation 14 during the welding process. A pump may be disposed within a supply line between a reservoir chamber 36 to facilitate the introduction and extraction of fluid from internal sealed volume 32 during a cooling process. To this end, a heat exchanger would be used in concert with the pump to remove unwanted heat from fluid 34. For a more detailed discussion of the use and apparatus of the heat exchanger, particular reference should be made to U.S. Pat. No. 5,949,959, the disclosure of which is incorporated herein by reference. Particular reference should also be paid to the '959 patent in reference to various fluid types for use in filtering and/or cooling of internal sealed volume 32 and also various material types for use as rigid sheet 26.

Welding apparatus 10 further includes a clamping device or outer fixture 38 having a lip 40 for use in retaining frame 30 of transparent pressure bladder 22. Outer fixture 38 may have any-shape necessary to accommodate first part 16, second part 18, and transparent pressure bladder 22. Outer fixture 38 mainly serves to provide a rigid and generally flat surface below second part 18. However, it should be understood that outer fixture 38 may have any shape which closely conforms to the desired shape of second part 18. On an opposing side, outer fixture 38 serves to provide structure against which transparent pressure bladder 22 may act during pressurization. That is, outer fixture 38 opposes the pressurizing force exerted upon first part 16 and second part 18 by transparent pressure bladder 22.

Welding apparatus 10 still further includes a controller 42, which is operably coupled to pump 24 for selectively actuating pump 24 during an inflating or deflating operation. Upon opening of pump 24 by controller 42, fluid 34 within reservoir chamber 36 is introduced into internal sealed volume 32 through line 44, thereby inflating transparent pressure bladder 22.

OPERATION

Referring to the drawing, the present invention is especially well suited for the TTIR welding of a first plastic part to a second plastic part. In one exemplary use of the present invention, first part 16 is a transmitting piece that is to be welded to second part 18. Transmitting piece 16 has the characteristic of absorbing little of radiation 14 as it transmits radiation 14 to welding zone 20. For this example, transmitting piece 16 and second part 18 may be polycarbonate plastic parts.

According to a preferred embodiment, an absorbing material 50 is placed in welding zone 20 to generate heat upon radiation 14 reaching welding zone 20 or the absorbing material may be molded into second part 18. Sufficient heat is generated by absorbing material 50 so as to weld transmitting piece 16 to second part 18. Absorbing material 50 contains carbon black; however, other absorbing material may be used that would generate sufficient heat to weld the parts. For this example, radiation source 12 is a series of laser diodes that produces a line of radiation that is contoured to match the weld line. This can be accomplished by placing a plurality of small diodes side-by-side or using a laser diode array that produces one continuous line of radiation approximately three to four inches in length. It should be understood that the specific intensity and duration of the radiation output is dependent upon the materials being welded, including the type of material, the thickness of material, the size of the weld, and the like.

With respect to the specific use of transparent pressure bladder 22, it is preferable to undertake the following operation in preparation for welding first part 16 to second part 18. Preferably, absorbing material 50, or second part 18 if second part 18 is naturally absorbing, is positioned between first part 16 and second part 18 in the general area of welding zone 20. The assembly of first part 16, second part 18, and absorbing material 50 may be performed either outside of outer fixture 38 or may be assembled in a step-like process wherein second part 18 is inserted within outer fixture 38 and absorbing material 50 is positioned within welding zone 20 while first part 16 is then placed thereon.

According to the illustrated embodiment of the present invention, transparent pressure bladder 22, including frame 30, may then be slid into position between a top surface of first part 16 and a lower surface of lip 40 of outer fixture 38. It should be understood, however, that depending upon the specific configuration of outer fixture 38, transparent pressure bladder 22 and frame 30 may be inserted or otherwise fastened to outer fixture 38 according to a number of different techniques. For example, transparent pressure bladder 22 and frame 30 may be dropped into position from above, whereby a moveable portion of outer fixture 38 is then positioned above frame 30 so as to engage and retain transparent pressure bladder 22 in position under pressurization.

Once transparent pressure bladder 22 is engaged within outer fixture 38, controller 42 is actuated so as to activate pump 24. The activation of pump 24 causes fluid 34 contained within reservoir chamber 36 to be pumped within internal sealed volume 32 of transparent pressure bladder 22 via line 44. Pump 24 continues to pump fluid 34 into internal sealed volume 32 until a predetermined pressure is achieved. This pressure causes a force (downward in the figure) to be exerted upon a top surface of first part 16 and, consequently, against second part 18. Second part 18 rests upon outer fixture 38, which resists such downward force. Consequently, first part 16 is squeezed into contact with second part 18 under a predetermined pressure. This predetermined pressure exerted by transparent pressure bladder 22 is generally uniform across the applied surface. That is, irregularities or deformations of first part 16 and/or second part 18 are accommodated by the generally uniform pressure applied thereon. Therefore, irrespective of tolerances or inconsistencies in the material, a predictable and consistent material engagement is produced along the welding interface. Therefore, an improved and predictable weld may be formed between first part 16 and second part 18.

Radiation source 12 is then activated to produce radiation 14, which serves to heat welding zone 20 to a temperature sufficient for welding, as described above. It has been found that the increase in contact pressure between first part 16 and second part 18 relative to ambient conditions serves to promote the welding process due to the increase in pressure. As one skilled in the art will understand, an increase in pressure causes an increase in uniformity. Once sufficient heat is generated in welding zone 20, radiation source 12 is turned off. However, preferably, transparent pressure bladder 22 continues to exert a downward force upon first part 16 and second part 18 to allow the weld to solidify under continued pressure. Once the weld has solidified sufficiently, line 44 is opened to release fluid 34 into reservoir chamber 36 and, thus, relieve the pressure exerted upon first part 16 and second part 18. The now welded assembly may then be removed from outer fixture 38. Preferably, outer fixture 38 is hinged so as to facilitate the removal of the welded part, either manually or by mechanical means.

It should be understood that the principles of the present invention may find utility in a number of welding applications. For example, the present invention may have utility in welding operations which use systems other than the TTIR welding technique. Specifically, it has been found that the present invention works well to weld absorbent sheets of plastic that are approximately less than 0.010 inches in thickness. Such sheets are welded by employing the transparent pressure bladder of the present invention and introducing radiation 14 to the top absorbent sheet. The top absorbent sheet then is heated by the absorption of the radiation and consequently heats the lower sheet through the heat transfer (i.e., conduction) through the bond line (i.e., weld zone). Thus, the principles of the present invention are not limited to TTIR welding techniques described above.

It should be apparent from the foregoing discussion that the transparent pressure bladder of the present invention provides a number of unique and useful advantages. For instance, the transparent pressure bladder of the present invention simultaneously enables a generally uniform pressure to be applied to parts being welded to create an improved and reliable welding interface while simultaneously providing unobstructed transmission of radiation from the radiation source. Such arrangement enables the present invention to accommodate dimensional variations in the parts being welded. Moreover, the transparent pressure bladder of the present invention also provides an opportunity to incorporate the filtering properties of various materials to generally eliminate or at least minimize the transmission of undesired wavelengths of radiation. Specifically, rigid sheet 26 and/or flexible sheet 28 of the present invention may be made of a material which provides absorption properties of radiation only at specific wavelengths. This serves to resist transmission of those undesired wavelengths of radiation to the parts being welded. Likewise, fluid 34 may be of a particular nature that serves to filter at least partially these undesired wavelengths of radiation. As noted above, the wavelength of radiation filtered by fluid 34 may be different than the wavelength of radiation filtered by one or both of the sheets 26, 28. Still further, the transparent pressure bladder of the present invention further serves to provide all of these advantages in a single manufacturing assembly, rather than a plurality of separate parts.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An inflatable bladder system for applying generally uniform pressure to parts being welded, said inflatable bladder system comprising:

a first sheet being generally transparent to electromagnetic radiation;

a second sheet being generally transparent to electromagnetic radiation, said second sheet being coupled to said first sheet to create a sealed volume therebetween; and a fluid source having a fluid, said fluid source selectively introducing said fluid into said sealed volume, said fluid expanding said sealed volume such that said second sheet is engageable with the parts being welded to exert a generally uniform pressure thereon.

2. The inflatable bladder system according to claim 1, further comprising:

a pumping device positioned in fluid communication between said fluid source and said sealed volume for selectively pumping said fluid from said fluid source into said sealed volume; and a controller operably coupled to said pumping device.

3. The inflatable bladder system according to claim 1 wherein said first sheet is rigid.

4. The inflatable bladder system according to claim 1 wherein said second sheet is flexible.

5. The inflatable bladder system according to claim 1 wherein said first sheet at least partially absorbs predetermined wavelengths of electromagnetic radiation to produce filtered radiation.

6. The inflatable bladder system according to claim 1 wherein said second sheet at least partially absorbs predetermined wavelengths of electromagnetic radiation to produce filtered radiation.

7. The inflatable bladder system according to claim 1 wherein said fluid source includes fluid that at least partially absorbs predetermined wavelengths of electromagnetic radiation to produce filtered radiation.

8. An apparatus for welding a zone between a first part and a second part, said apparatus comprising:

a radiation source emitting electromagnetic radiation; and a bladder coupled to a fixture, said bladder being generally transparent to said electromagnetic radiation so as to generally unobstruct said electromagnetic radiation, said bladder being selectively inflatable so as to be engageable with at least one of the parts, applying a generally uniform pressure thereon during welding.

9. The apparatus according to claim 8 wherein said bladder comprises:

a first sheet; and a second sheet being coupled to said first sheet to create a sealed volume therebetween.

10. The apparatus according to claim 9, further comprising:

a fluid source having a fluid, said fluid source in fluid communication with said sealed volume;

a pumping device positioned in fluid communication between said fluid source and said sealed volume for selectively pumping said fluid from said fluid source into said sealed volume, said fluid expanding said sealed volume such that said second sheet is engageable with at least one of the parts; and a controller operably coupled to said pumping device.

11. The apparatus according to claim 9 wherein said first sheet is rigid.

12. The apparatus according to claim 9 wherein said second sheet is flexible.

13. The apparatus according to claim 9 wherein said first sheet at least partially absorbs predetermined wavelengths of electromagnetic radiation to produce filtered radiation.

14. The apparatus according to claim 9 wherein said second sheet at least partially absorbs predetermined wavelengths of electromagnetic radiation to produce filtered radiation.

15. The apparatus according to claim 10 wherein said fluid at least partially absorbs predetermined wavelengths of electromagnetic radiation to produce filtered radiation.

16. The apparatus according to claim 9, further comprising:

a fixture slidably supporting said bladder.

17. An apparatus for welding a first part and a second part, said apparatus comprising:

a radiation source emitting electromagnetic radiation;

a fixture capable of receiving the first part and the second part;

a bladder being generally transparent to said electromagnetic radiation so as to generally unobstruct said electromagnetic radiation, said bladder including a first sheet and a second sheet coupled to said first sheet to create a sealed volume therebetween;

a fluid source having a fluid;

a pumping device positioned in fluid communication between said fluid source and said sealed volume for selectively pumping said fluid from said fluid source into said sealed volume, said fluid inflating said sealed volume such that said second sheet is engageable with at least one of the parts; and a controller operably coupled to said pumping device.

18. The apparatus according to claim 17 wherein said first sheet is rigid.

19. The apparatus according to claim 17 wherein said second sheet is flexible.

20. The apparatus according to claim 17 wherein said first sheet at least partially absorbs predetermined wavelengths of electromagnetic radiation to produce filtered radiation.

21. The apparatus according to claim 17 wherein said second sheet at least partially absorbs predetermined wavelengths of electromagnetic radiation to produce filtered radiation.

22. The apparatus according to claim 17 wherein said fluid at least partially absorbs predetermined wavelengths of electromagnetic radiation to produce filtered radiation.

23. A method for applying a generally uniform pressure to a first part and a second part during a welding process, said method comprising:

positioning an inflatable bladder adjacent to the first part;

inflating said inflatable bladder so as to apply a generally uniform pressure upon the first part; and emitting a radiation from a radiation source, at least a part of said radiation transmitting through said inflatable bladder to at least one of the first part and the second part.

24. The method according to claim 23 wherein said inflating said inflatable bladder includes introducing a fluid into a sealed volume of said inflatable bladder.

25. The method according to claim 23, further comprising:

absorbing predetermined wavelengths of said radiation by said inflatable bladder.

26. The method according to claim 24, further comprising:

absorbing predetermined wavelengths of said radiation by said fluid.

27. A method for applying a generally uniform pressure to a first part and a second part during a welding process, said method comprising:

positioning an inflatable bladder adjacent to the first part;

introducing a fluid into a sealed volume of said inflatable bladder so as to apply a generally uniform pressure upon the first part;

emitting a radiation from a radiation source; and absorbing predetermined wavelengths of said radiation by said inflatable bladder, at least a part of said radiation transmitting through said inflatable bladder to at least one of the first part and second part.

28. The method according to claim 27, further comprising:

absorbing predetermined wavelengths of said radiation by said fluid.

* * * * *